(12) United States Patent
Tsai et al.

(10) Patent No.: US 11,595,632 B2
(45) Date of Patent: Feb. 28, 2023

(54) CAMERA CONFIGURATION SYSTEM

(71) Applicant: Samsara Networks Inc., San Francisco, CA (US)

(72) Inventors: Evaline Shin-Tin Tsai, Cupertino, CA (US); Ishaan Kansal, San Francisco, CA (US); Kieran K. Gupta, San Francisco, CA (US)

(73) Assignee: Samsara Networks Inc., San Francisco, CA (US)

( * ) Notice: Subject to any disclaimer, the term of this patent is extended or adjusted under 35 U.S.C. 154(b) by 0 days.

(21) Appl. No.: 16/723,567

(22) Filed: Dec. 20, 2019

(65) Prior Publication Data

US 2021/0195166 A1    Jun. 24, 2021

(51) Int. Cl.
*H04N 13/243*    (2018.01)
*H04N 13/239*    (2018.01)
*H04N 5/247*    (2006.01)
*H04N 13/246*    (2018.01)

(52) U.S. Cl.
CPC ........... *H04N 13/243* (2018.05); *H04N 5/247* (2013.01); *H04N 13/239* (2018.05); *H04N 13/246* (2018.05)

(58) Field of Classification Search
CPC .. H04N 13/243; H04N 13/246; H04N 13/239; H04N 5/247

USPC ........................................................... 348/46
See application file for complete search history.

(56) References Cited

U.S. PATENT DOCUMENTS

| | | | |
|---|---|---|---|
| 2011/0255775 A1* | 10/2011 | McNamer | G06T 7/593 382/154 |
| 2014/0285674 A1* | 9/2014 | Takayama | H04N 5/23219 348/169 |
| 2015/0139493 A1* | 5/2015 | Takeno | G06V 20/00 382/103 |
| 2015/0229838 A1* | 8/2015 | Hakim | H04N 5/23222 348/333.02 |
| 2018/0164981 A1* | 6/2018 | Park | G06F 3/14 |
| 2018/0239417 A1* | 8/2018 | Fu | G06F 3/0488 |
| 2019/0124290 A1* | 4/2019 | Yuan | H04N 5/63 |
| 2020/0059596 A1* | 2/2020 | Yoo | G06T 7/73 |
| 2021/0157465 A1* | 5/2021 | Turk | G06F 3/04883 |

* cited by examiner

Primary Examiner — Rebecca A Volentine
Assistant Examiner — Matthew David Kim
(74) Attorney, Agent, or Firm — Schwegman Lundberg & Woessner, P.A.

(57) ABSTRACT

Example embodiments described herein relate to a camera configuration system to perform operations that include: capturing an image at a sensor device, the image comprising a set of image features; accessing a calibration template in response to the capturing the image at the sensor device; generating a presentation of the image, the presentation of the image including a display of the calibration template overlaid upon the image; and causing display of the presentation of the image at a client device.

20 Claims, 9 Drawing Sheets

IDENTIFYING A FACE AT A POSITION WITHIN THE IMAGE BASED ON THE
SET OF IMAGE FEATURES
402

APPLYING THE GRAPHICAL INDICATOR TO THE IMAGE BASED ON THE
POSITION OF THE FACE DEPICTED BY THE IMAGE
404

```
┌─────────────────────────────────────────────────────────────┐
│  IDENTIFYING A HORIZON AT A POSITION WITHIN THE IMAGE BASED ON │
│              THE SET OF IMAGE FEATURES                       │
│                         502                                  │
└─────────────────────────────────────────────────────────────┘
                              │
                              ▼
┌─────────────────────────────────────────────────────────────┐
│  APPLYING THE GRAPHICAL INDICATOR TO THE IMAGE BASED ON THE  │
│     POSITION OF THE HORIZON DEPICTED BY THE IMAGE            │
│                         504                                  │
└─────────────────────────────────────────────────────────────┘
```

CAMERA CONFIGURATION SYSTEM

TECHNICAL FIELD

Embodiments of the present disclosure relate to systems and methods for configuring one or more sensor devices, wherein the sensor devices may include a camera.

BACKGROUND

A dashcam, or event data recorder (EDR), is an onboard camera that continuously records the view through a vehicle's front windscreen and sometimes the interior of the vehicle.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As discussed above, a dashcam is an onboard camera that continuously records the view through a vehicle's front windscreen and sometimes the interior of the vehicle. Dashcams are generally configured to be mounted to the windscreen or dashboard of a vehicle, in a position where the dashcam can record video of the view in front of the vehicle. A common problem which may negatively impact the functionality of dashcams is improper installation of the dashcam within a vehicle. For example, improper installation may include mounting the dashcam too close to a rear-view mirror, or visor, too high up on a windshield, too low on a windshield, or at a poor angle. Improper installation may therefore result in a reduced field of view, which may negatively impact the quality of footage recorded by the dashcam.

Accordingly, example embodiments described herein relate to a camera configuration system to perform operations that include: capturing an image at a sensor device, the image comprising a set of image features; accessing a calibration template in response to the capturing the image at the sensor device; generating a presentation of the image, the presentation of the image including a display of the calibration template overlaid upon the image; and causing display of the presentation of the image at a client device.

As an illustrative example, a user may mount a dashcam in a vehicle. In order to test and calibrate the positioning of the dashcam, the camera configuration system activates a sensor device to generate an image or video stream, wherein the image or video stream may be presented at a client device. In order to ensure accurate mounting of the dashcam, the camera configuration system accesses a calibration template, wherein the calibration template comprises a calibration indicator to be overlaid at a position within the presentation of the video stream at the client device. Thus, by referencing the presentation of the video stream at the client device, the dashcam may be configured or calibrated to an optimal position based on feedback provided by the calibration indicator.

In some embodiments, the camera configuration system may identify one or more objects depicted by the video stream and select a calibration template from among a plurality of calibration templates based on the one or more objects. For example, the one or more objects may include a head, or face, a road, a horizon, as well as street signs. For example, responsive to identifying a head or face depicted in the video stream, the camera configuration system may select a calibration template that comprises a calibration indicator to optimally configure a position of the dashcam to clearly record a driver's face.

Similarly, responsive to identifying a horizon depicted by the video stream, the camera configuration system may select a calibration template that comprises a calibration indicator that optimally aligns the dashcam to record a view from the perspective of the driver of the vehicle, such that the horizon is not too high or too low in the presentation of the video stream. Accordingly, based on relative positions of the one or more objects depicted in the video stream against the corresponding calibration template, a user may adjust the positioning of the dashcam to ensure a proper mount. In some embodiments, the camera configuration system may include a motorized mount to enable the camera configuration system to calibrate a mounting position of the dashcam based on relative positions of one or more elements depicted in the video stream to the calibration indicator.

In some embodiments, graphical properties of the calibration indicator may be presented based on attributes of the sensor data that indicate relative positions of the one or more objects depicted in the presentation of the video stream to the calibration indicator of the corresponding calibration template. The graphical properties may include a color or shape of the calibration indicator. For example, the camera configuration system may access a first set of image attributes from the video stream in order to determine a first display state of the calibration indicator, wherein the first display state corresponds with a first set of graphical properties (i.e., a first color). The camera configuration system may then access a second set of image attributes from the video stream in order to determine a second state of the calibration indicator, wherein the second state corresponds with a second set of graphical properties (i.e., a second color).

A user of the camera configuration system may mount a dashcam within a vehicle and view a presentation of the video stream generated by the dashcam at a client device. The camera configuration system overlays a calibration indicator upon the presentation of the video stream, wherein the calibration indicator provides the user with a visual indication of how to adjust the dashcam to optimize performance of the dashcam. For example, the calibration indicator may include directional indicators, such as arrows, as well as a magnitude indicator, to indicate how much the dashcam needs to be adjusted in order to be optimally positioned.

Consider an illustrative example from a user perspective. A user mounts a dashcam within a vehicle, wherein the dashcam includes both an interior/cabin facing camera, as well as a forward-facing camera. Having mounted the dashcam, the user may activate a camera configuration system, wherein the camera configuration system may perform operations to activate the cameras on the dashcam, and cause display of a presentation of a video stream at a client device. The camera configuration system may access the video stream and select a calibration template based on image attributes from the video stream, wherein the calibration template includes corresponding calibration indicators that include graphical properties. For example, the camera configuration system may determine that the video stream depicts a forward perspective from the dashcam and includes a depiction of the horizon in front of the vehicle, and may select a calibration template that comprises a calibration indicator to calibrate a position of the dashcam based on the location of the horizon within the presentation of the video stream.

The user of the camera configuration system may then view the presentation of the video stream at the client device and make determinations on how much and which direction in which to adjust the dashcam. The camera configuration system may then vary graphical properties of the calibration indicator in real time in order to assist the user in adjusting the positioning of the dashcam. For example, as the user adjusts the position of the dashcam, a calibration indicator may change from red to green to indicate to the user that the position of the dashcam is optimized.

Figure 1:
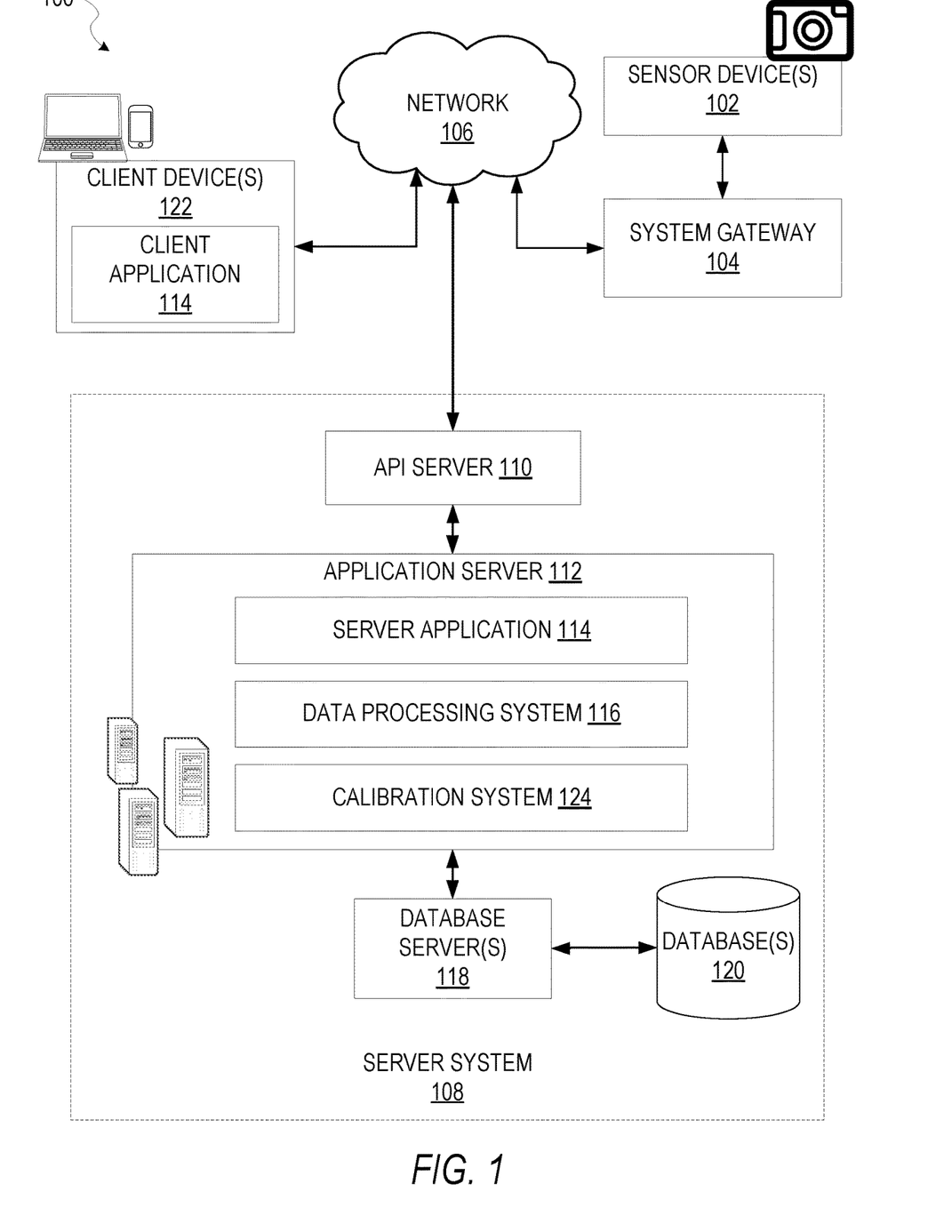
FIG. 1 is a block diagram showing an example system for exchanging data (e.g., sensor data and associated content) over a network in accordance with some embodiments, wherein the system includes a calibration system.

FIG. 1 is a block diagram showing an example system 100 for detecting events based on sensor data. The system 100 includes one or more client device(s) 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device(s) 102 and the system gateway 104. While certain functions of the system 100 are described herein as being performed by either a client application 114, the sensor device(s) 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the sensor device(s) 102, or system gateway 104, where there may be sufficient processing capacity.

The server system 108 supports various services and operations that are provided to the client application 114. Such operations include transmitting data to, receiving data from, and processing data generated by the client application 114, the sensor device(s) 102, and the system gateway 104. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and a camera configuration system 124. The camera configuration system 124 is configured to perform operations that include: capturing an image at a sensor device, the image comprising a set of image features; accessing a calibration template in response to the capturing the image at the sensor device; generating a presentation of the image, the presentation of the image including a display of the calibration template overlaid upon the image; and causing display of the presentation of the image at a client device 102, according to some example embodiments. Further details of the camera configuration system 124 can be found in FIG. 2 below.

The server application 114 implements a number of data processing technologies and functions, particularly related to the aggregation and other processing of data (e.g., sensor data generated by the sensor devices 102). As will be described in further detail, the sensor data generated by the sensor devices 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor devices 102 and processed by the server application 114.

Figure 2:
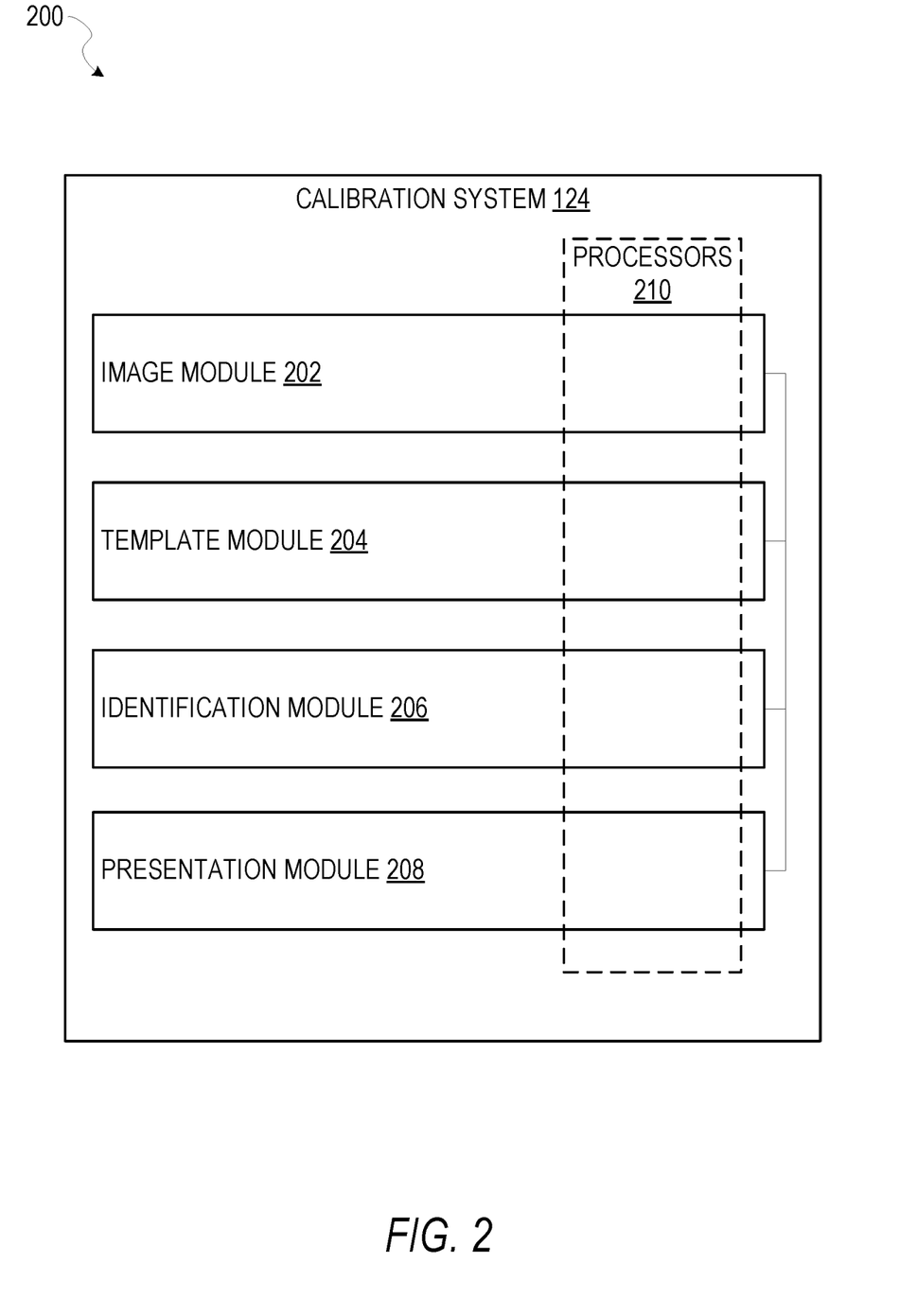
FIG. 2 is a block diagram illustrating various modules of a calibration system, according to certain example embodiments.

FIG. 2 is a block diagram illustrating components of the camera configuration system 124 that configure the camera configuration system 124 to perform operations to access sensor data generated by a plurality of sensor devices, detect events or precursors to events based on the sensor data, and to access an object model that corresponds to the event or precursor to the event detected based on the sensor data, according to some example embodiments.

The camera configuration system 124 is shown as including a image module 202, a template module 204, an identification module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the camera configuration system 124 may physically include an arrangement of one or more of the processors 210 (e.g., a subset of or among the one or more processors of the machine) configured to perform the operations described herein for that module. As another example, any module of the camera configuration system 124 may include software, hardware, or both, that configure an arrangement of one or more processors 210 (e.g., among the one or more processors of the machine) to perform the operations described herein for that module. Accordingly, different modules of the camera configuration system 124 may include and configure different arrangements of such processors 210 or a single arrangement of such processors 210 at different points in time. Moreover, any two or more modules of the camera configuration system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
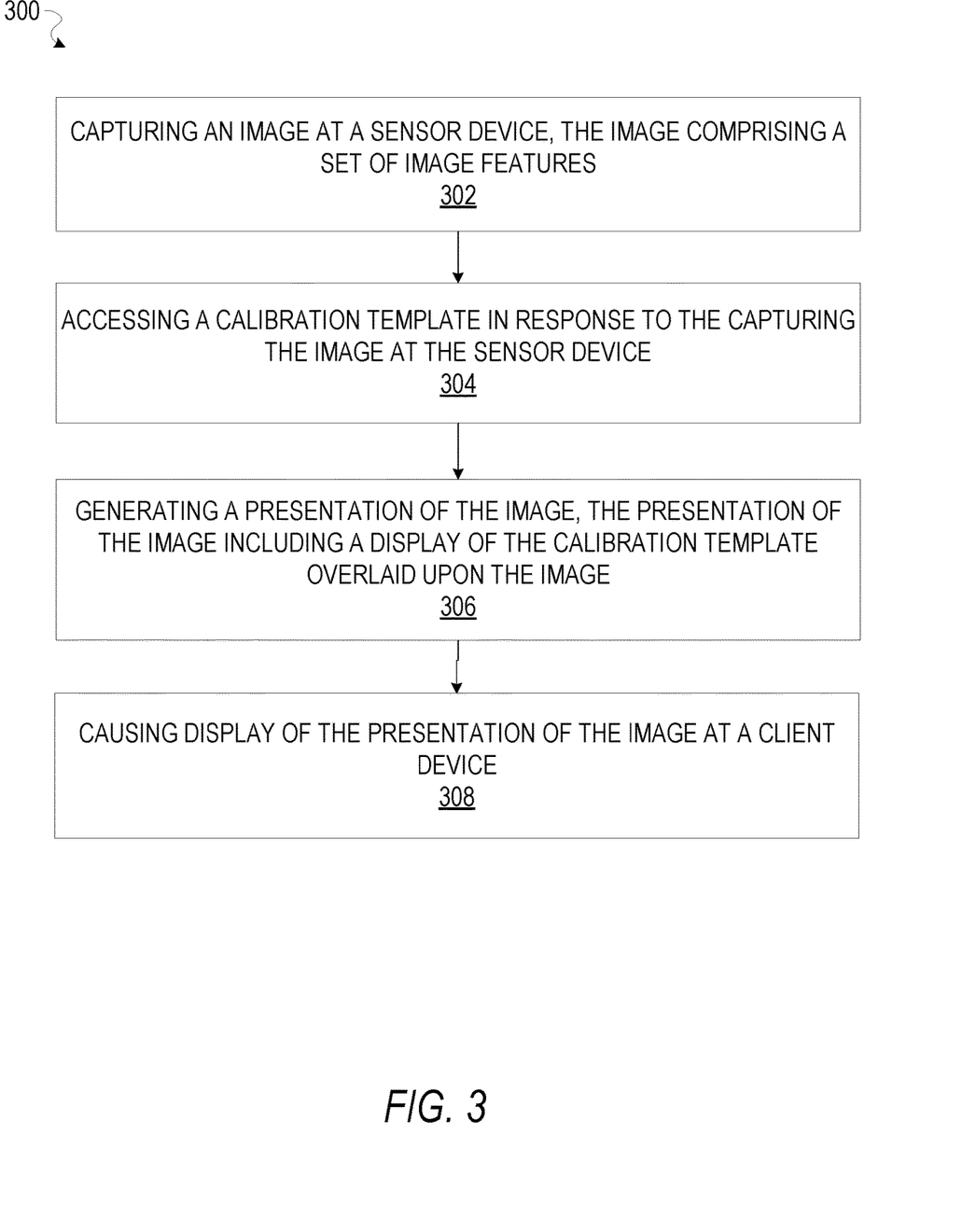
FIG. 3 is a flowchart depicting a method of calibrating a sensor device, according to certain example embodiments.

FIG. 3 is a flowchart depicting a method 300 of calibrating a sensor device, according to certain example embodiments. Operations of the method 300 may be performed by the modules described above with respect to FIG. 2. As shown in FIG. 3, the method 300 includes one or more operations 302, 304, 306, and 308.

At operation 302, the image module 202 captures an image at a sensor device, wherein the image comprises a set of image features. For example, the sensor device may include a camera, such as a camera associated with a dashcam.

At operation 304, the template module 204 accesses a calibration template in response to the capturing the image at the sensor device. For example, the template module 204 may select a calibration template from among a plurality of calibration templates based on the set of image features of the image.

In some embodiments, the template module 204 may select a calibration template based on an input received from the client device 102. For example, the user of the client device 102 may provide an input that selects the calibration template from among a plurality of calibration templates.

In some embodiments, the template module 204 may select a calibration template based on attributes of the sensor device itself. For example, the template module 204 may be configured to correlate a calibration template with a sensor device identifier. As an illustrative example, a first calibration template may be associated with an inward/cabin-facing camera, while a second calibration template may be associated with a forward-facing camera, wherein the calibration templates include corresponding calibration indicators based on objects or elements which may be anticipated in images captured by the sensor devices. For example, a cabin-facing camera may optimally be configured to capture images of a driver, or a face of the driver, whereas a forward-facing camera may be optimally configured to capture a forward view from the cabin of a vehicle.

According to certain example embodiments, the calibration template may comprise one or more calibration indicators, wherein the calibration indicators correspond with objects depicted by the image. For example, a first calibration template may comprise a first calibration indicator, wherein the first calibration indicator corresponds with a first set of image features, wherein a second calibration template comprises a second calibration indicator, wherein the second calibration indicator corresponds with a second set of image features.

At operation 306, the presentation module 208 generates a presentation of the image captured by the sensor device, wherein the presentation of the image includes a display of the calibration template overlaid at a position within the image, based on positions of the set of image features. For example, the set of image features may depict a head, or face, and the calibration template accessed by the template module may comprise a calibration indicator that indicates an optimal position of a head or face within the presentation of the image (i.e., a box placed at a central position within the presentation of the image).

At operation 308, the presentation module 208 causes display of the presentation of the image at a client device 102. Accordingly, a user of the client device 102 may review the presentation of the image in order to make appropriate adjustment to the mounting of the sensor device (i.e., dashcam).

Figure 4:
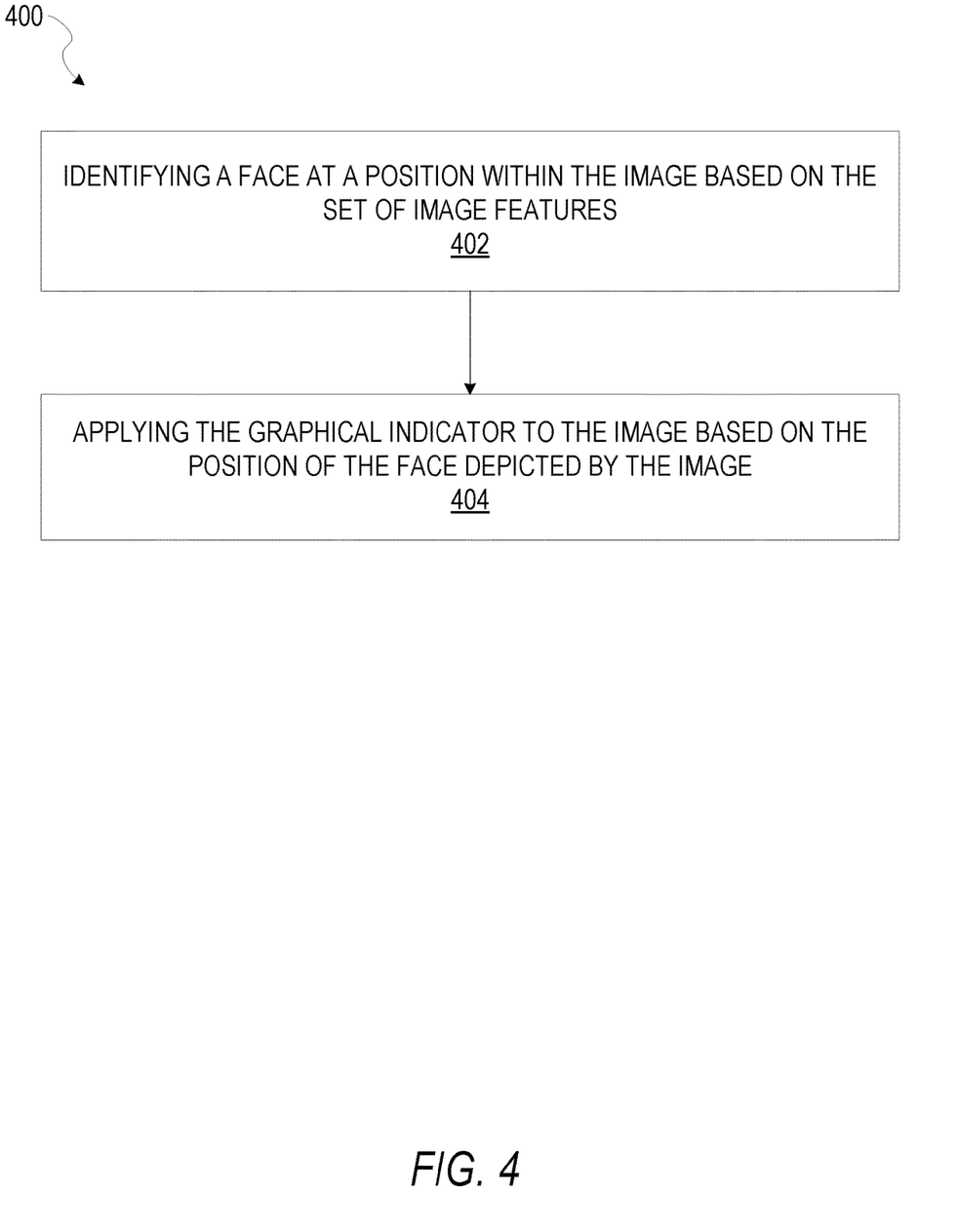
FIG. 4 is a flowchart depicting a method of calibrating a sensor device, according to certain example embodiments

FIG. 4 is a flowchart depicting a method 400 of calibrating a sensor device, according to certain example embodiments. Operations of the method 400 may be performed by the modules described above with respect to FIG. 2. As shown in FIG. 4, the method 400 includes one or more operations 402, and 404. In some embodiments, the operations of the method 400 may be performed as a precursor to, or subroutine of, one or more of the operations of the method 300 depicted in FIG. 3, such as operation 306 wherein the presentation module 308 generates a presentation of the image.

At operation 402, the identification module 206 identifies a face at a position within the image based on the set of image features of the image. Responsive to the identification module 206 detecting the face at the position in the image, the template module 204 may select a calibration template from a plurality of calibration templates based on the position of the face in the image. The calibration template comprises a graphical indicator (i.e., a calibration indicator) to be overlaid upon the image.

At operation 404, the presentation module 208 generates a presentation of the image to be presented at the client device 102, by applying the graphical indicator of the calibration template to the image, based on the position of the face depicted by the image. In some embodiments, the graphical indicator may include a frame element, such as the frame element depicted as graphical indicator 804 of FIG. 8, wherein the frame element may overlaid at a predefined position within an image frame.

Figure 5:
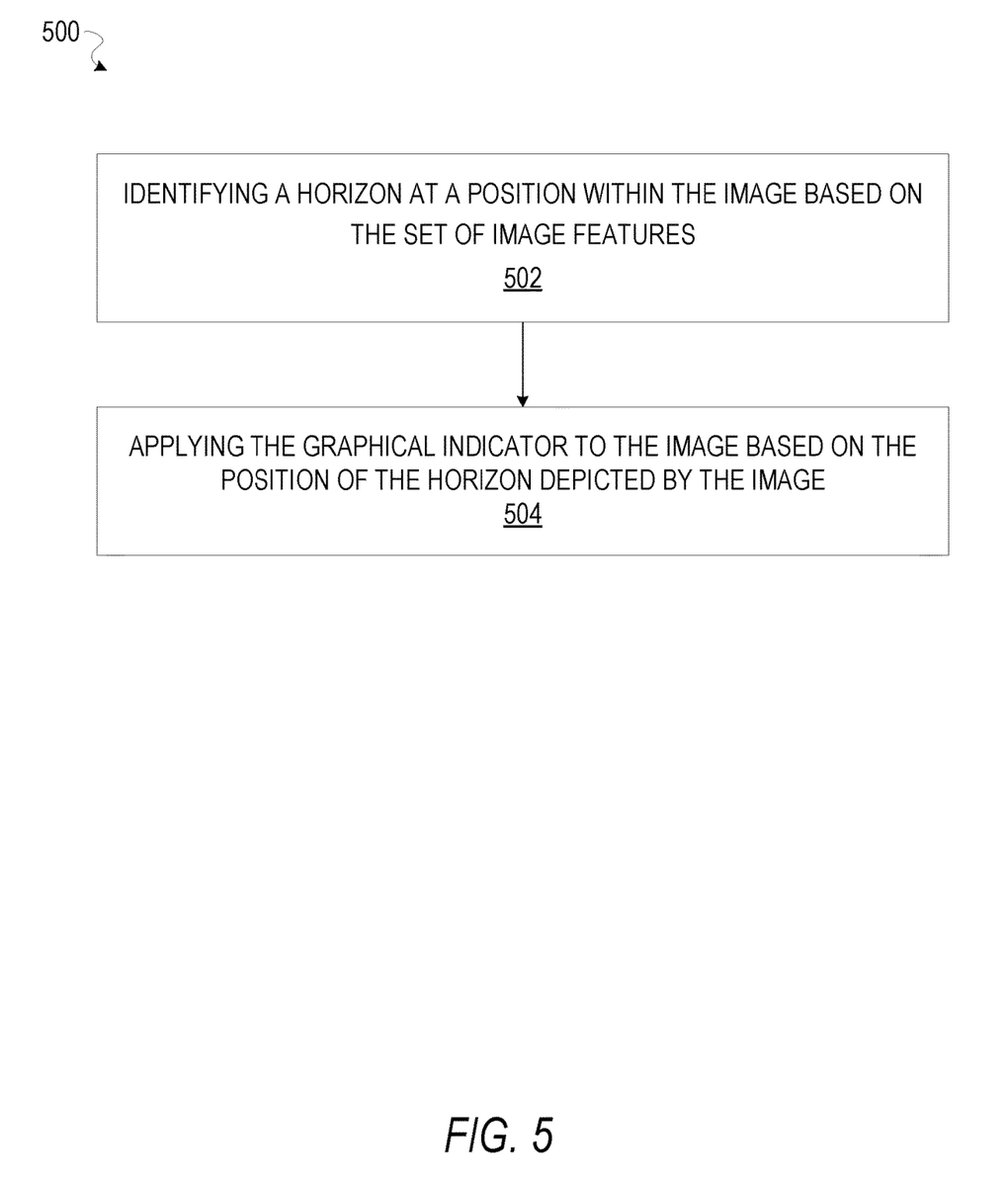
FIG. 5 is a flowchart depicting a method of calibrating a sensor device, according to certain example embodiments.

FIG. 5 is a flowchart depicting a method 500 of calibrating a sensor device, according to certain example embodiments. Operations of the method 500 may be performed by the modules described above with respect to FIG. 2. As shown in FIG. 5, the method 500 includes one or more operations 502, and 504. In some embodiments, the operations of the method 500 may be performed as a precursor to, or subroutine of, one or more of the operations of the method 300 depicted in FIG. 3, such as operation 306 wherein the presentation module 308 generates a presentation of the image.

Similar to the method 400, the method 500 depicts a method of selecting a calibration template based on image attributes of an image, and then generating a presentation of the image to be displayed at a client device 102, by overlaying a calibration indicator from a calibration template upon the image. At operation 502, the identification module 206 identifies a depiction of the horizon at a position within the image based on the set of image features of the image. Responsive to the identification module 206 detecting the horizon at the position in the image, the template module 204 selects a calibration template from a plurality of calibration templates based on the position of the horizon in the image. The calibration template comprises a graphical indicator (i.e., a calibration indicator) to be overlaid upon the image, and to provide an indication of an optimal position of the horizon in the image.

At operation 504, the presentation module 208 generates a presentation of the image to be presented at the client device 102, by applying the graphical indicator of the calibration template to the image based on the position of the horizon depicted by the image. For example, the graphical indicator may include a horizon indicator that comprises a reference line presented at a position within the image. The reference line may therefore indicate an optimal position in which the horizon should be located within the presentation of the image. Accordingly, in certain embodiments, the horizon indicator may also include elements to indicate a magnitude and direction in which a sensor device (i.e., dashcam) is to be adjusted.

Figure 6:
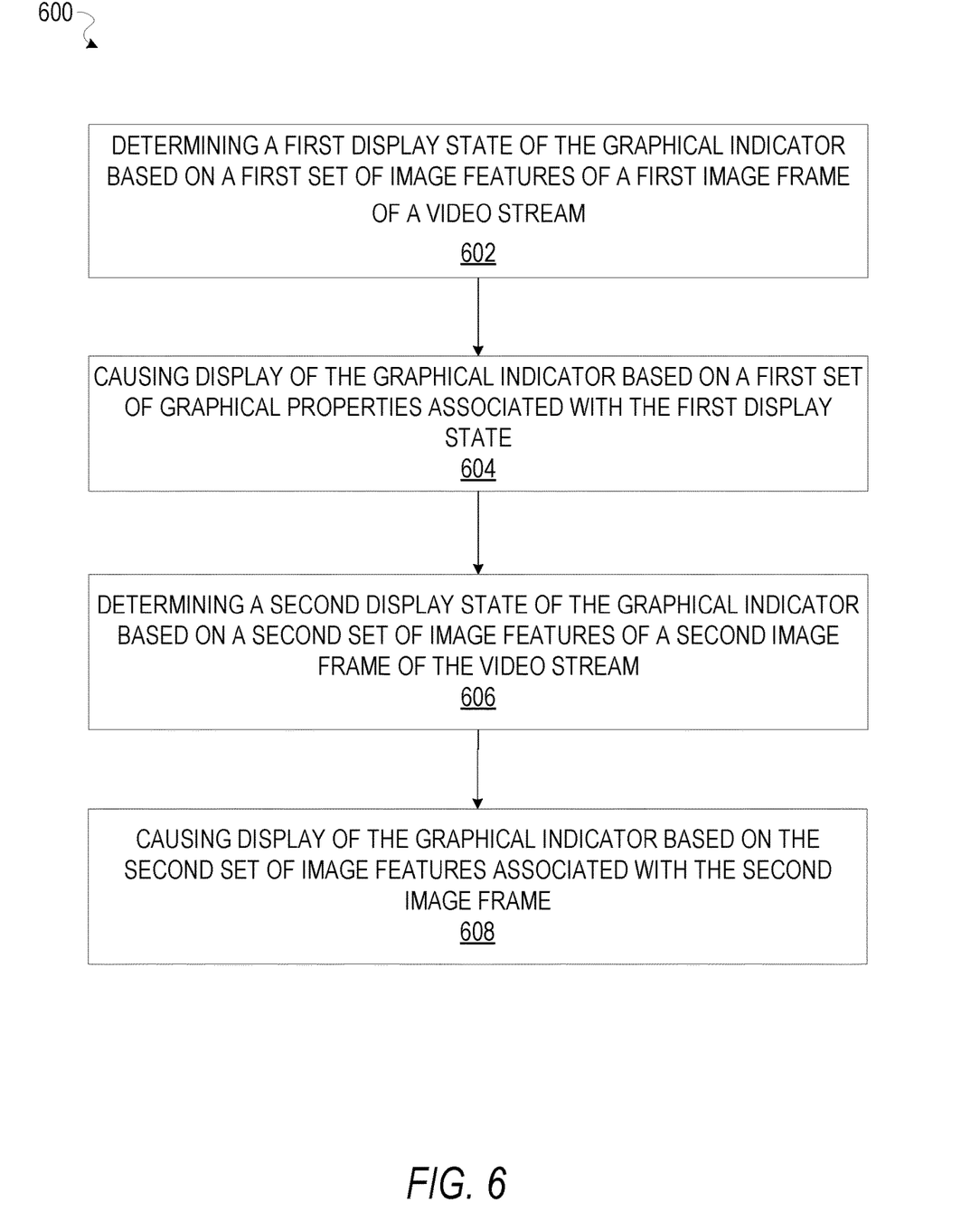
FIG. 6 is a flowchart depicting a method of calibrating a sensor device, according to certain example embodiments.

FIG. 6 is a flowchart depicting a method 600 of calibrating a sensor device, according to certain example embodiments. Operations of the method 600 may be performed by the modules described above with respect to FIG. 2. As shown in FIG. 6, the method 600 includes one or more operations 602, 604, 606, and 608. In some embodiments, the operations of the method 600 may be performed as a precursor to, or subroutine of, one or more of the operations of the method 300 depicted in FIG. 3, such as operations 306 and 308, wherein the presentation module 308 generates and causes display of a presentation of the image.

At operation 602, the presentation module 208 determines a first display state of the graphical indicator based on a first set of image features of a first image frame of a video stream. The first display state may correspond with a first set of graphical properties that include a color, a shape, as well as graphical elements.

At operation 604, the presentation module 208 causes display of the graphical indicator based on the first set of graphical properties associated with the first display state. As an illustrative example, the first set of image features may correspond with a first set of graphical properties that includes a first color. The presentation module 208 accesses the first set of image features from the first image frame of the video stream and determines the first display state to present the graphical indicator based on the first set of image features. The presentation module 208 may then present the graphical indicator within a presentation of the video stream in the first color that corresponds with the first display state.

At operation 606, the presentation module 208 determines a second display state of the graphical indicator based on a second set of image features of a second image frame of the video stream. The second display state may correspond with a second set of graphical properties.

At operation 608, the presentation module 208 causes display of the graphical indicator based on the second set of graphical properties associated with the second display state. Continuing the illustrative example discussed above, the second set of image features may correspond with a second set of graphical properties that includes a second color. The presentation module 208 accesses the second set of image features from the second image frame of the video stream and determines, in real-time, the second display state to present the graphical indicator. The presentation module 208 may then update a display of the graphical indicator within the presentation of the video stream based on the second color that corresponds with the second display state.

Accordingly, a user may view the presentation of the video stream at the client device, wherein the presentation of the video stream includes a display of the graphical indicator. The user may then adjust a position of a sensor device and review graphical properties of the graphical indicator in real-time in order to optimally calibrate a position of the sensor device.

In some embodiments, responsive to determining that the sensor device has been optimally positioned, based on corresponding image features from an image frame of the video stream, the presentation module 208 may present a notification at a client device 102, wherein the notification provides an indication that an optimal position has been set.

Figure 7:
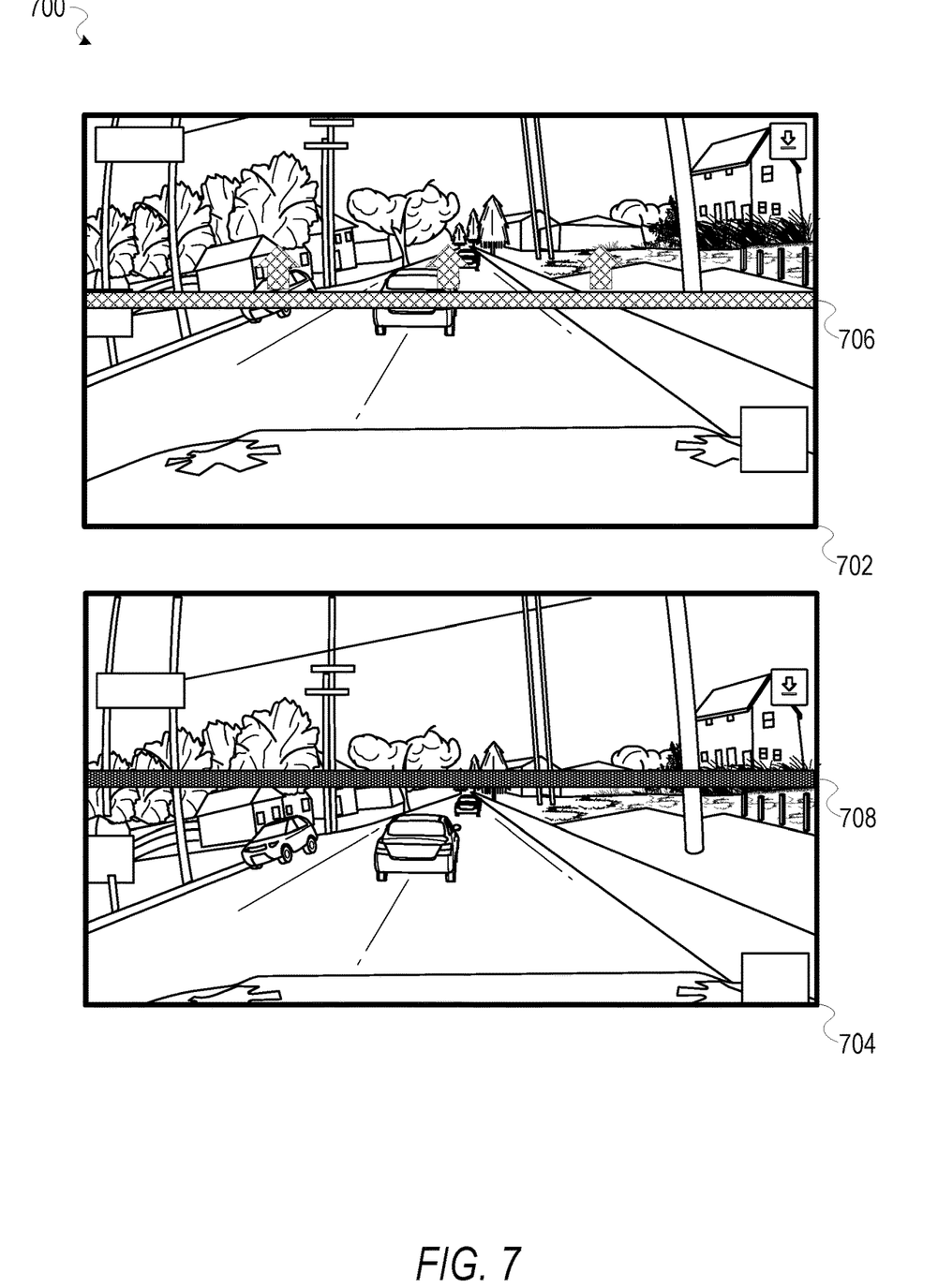
FIG. 7 is an interface flow-diagram depicting interfaces presented by a calibration system, according to certain example embodiments.

FIG. 7 is an interface flow-diagram 700 depicting interfaces presented by a calibration system 124, according to certain example embodiments. As seen in the interface flow-diagram 700, the calibration system 124 may cause display of the graphical user interfaces (GUI) 702 and 704 at a client device 102, wherein the interfaces 702 and 704 comprise a presentation of sensor data which may include a video stream generated by a sensor device, such as a dashcam.

As seen in the GUI 702, the calibration system 124 causes display of a graphical indicator 706 at a position within the GUI 702, based on attributes of the sensor data presented within the GUI 702. As seen in GUI 702, the sensor data may include an image, or video stream, generated by a sensor device. As discussed in the method 500 of FIG. 5, the calibration system 124 may identify a location of a horizon within the sensor data, and cause display of the graphical indicator 706 based on the attributes of the sensor data.

As seen in the GUI 702, the graphical indicator 706 may provide an indication of a direction or magnitude in which to adjust the sensor device in order to place the horizon at an optimal position. In some embodiments, the calibration system 124 may vary graphical properties of the graphical indicator 706 based on the attributes of the sensor data.

As seen in the GUI 704, a user of the calibration system 124 may have reoriented a sensor device such that the horizon has been repositioned based on the feedback provided by the graphical indicator 706. Responsive to the calibration system 124 determining that the horizon depicted by the sensor data is at an optimal position, the calibration system 124 may present the graphical indication 708.

Figure 8:
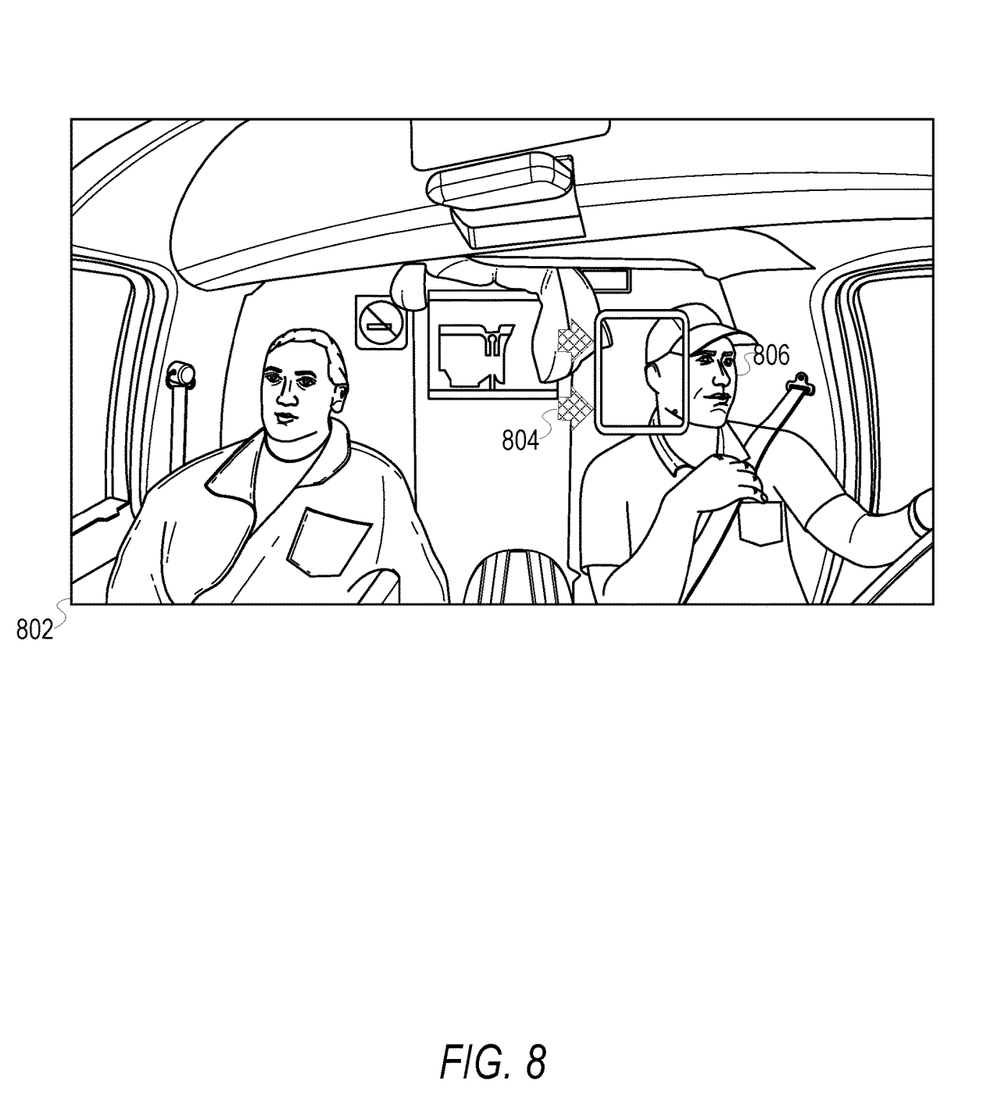
FIG. 8 is an interface diagram depicting a graphical user interface to present sensor data from one or more sensor devices, according to certain example embodiments.

FIG. 8 is an interface diagram 800 depicting a GUI 802 to display sensor data, according to certain example embodiments. As seen in GUI 802, the calibration system 124 may cause display of a graphical indicator 804 based on various image attributes of the sensor data presented within the GUI 802. As discussed in the method 400 of FIG. 4, the graphical indicator 804 may include a frame element as seen in the interface diagram 800, wherein the frame element may be presented at a position within the image. The position may for example be based on a set of predefined positioning coordinates (i.e., an X, and Y value) that may be set by an administrator of the calibration system 124, and may correspond with features of the image.

According to certain embodiments, responsive to determining that the sensor device is an inward/cabin-facing dashcam, the calibration system 124 may select a calibration template that comprises the graphical indicator 804, wherein the graphical indicator 804 provides an indication of an optimal position for the dashcam in order to record a driver's face and head. For example, the calibration system 124 may determine that the sensor device is an inward/cabin-facing dashcam based on attributes of the sensor data itself or based on a device identifier associated with the sensor device.

As seen in the GUI 802, the graphical indicator 804 may be based on positions of various features in the image data, such as the face 806. Accordingly, the calibration system 124 may present the graphical indicator 804 based on the location and properties of the face 806.

Figure 9:
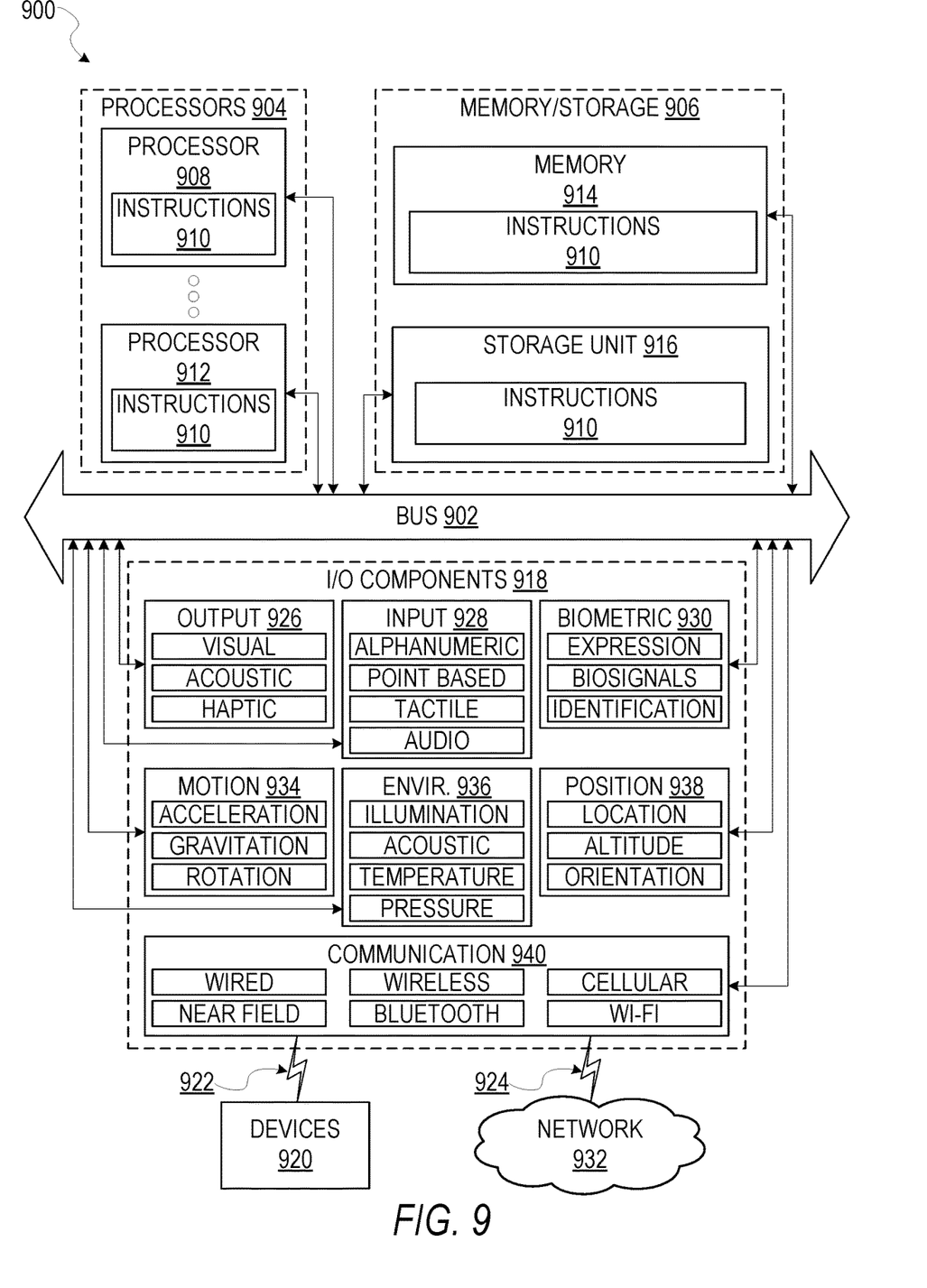
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900.

Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    accessing image data generated by a sensor device that comprises a device attribute, the image data comprising an image within an image frame, the image comprising a set of image features that depict an object at a position within the image;
    accessing a calibration template from among a plurality of calibration templates based on at least the device attribute of the sensor device, the calibration template comprising a graphical indicator that comprises a set of graphical properties based on the position of the object within the image, and provides an indication of an optimal position of the object depicted by the image within the image frame, the graphical properties including a color that corresponds with the position of the object within the image relative to the graphical indicator;

generating a presentation of the image that includes a display of the graphical indicator of the calibration template overlaid upon the image; and causing display of the presentation of the image that includes the display of the graphical indicator overlaid upon the image at a client device communicatively coupled with the sensor device.

2. The method of claim 1, wherein the accessing the calibration template includes:

selecting the calibration template from among a set of calibration templates based on the set of image features of the image.

3. The method of claim 1, wherein the generating the presentation of the image that includes the display of the graphical indicator includes:

applying the graphical indicator within the image frame based on the optimal position of the object indicated by the calibration template set of image features.

4. The method of claim 3, wherein the applying the graphical indicator to the position within the image includes:

identifying a face at a position within the image based on the set of image features; and applying the graphical indicator to the image based on the position of the face depicted by the image.

5. The method of claim 3, wherein the applying the graphical indicator to the position within the image includes:

identifying a horizon at a position within the image based on the set of image features; and applying the graphical indicator to the image based on the position of the horizon depicted by the image.

6. The method of claim 3, wherein the applying the graphical indicator to the image based on the set of image features includes:

determining a first display state of the graphical indicator based on the set of image features of the image, the first display state including graphical properties; and causing display of the graphical indicator based on the graphical properties of the first display state.

7. The method of claim 3, wherein the image is a first image frame from a plurality of image frames of a video stream, the set of image features are a first set of image features, and the applying the graphical indicator to the first image frame based on the set of image features includes:

determining a first display state of the graphical indicator based on the first set of image features of the first image frame of the video stream, the first display state including a first set of graphical properties;

causing display of the graphical indicator upon the presentation of the video stream at the client device based on the first set of graphical properties associated with the first display state;

determining a second display state of the graphical indicator based on a second set of image features of a second image frame from among the plurality of image frames of the video stream; and causing display of the graphical indicator upon the presentation of the video stream at the client device based on the second set of graphical properties associated with the second display state.

8. A system comprising:

at least one sensor device to generate sensor data comprising a plurality of data streams;

a memory; and at least one hardware processor to perform operations comprising:

accessing image data generated by a sensor device that comprises a device attribute, the image data comprising an image within an image frame, the image comprising a set of image features that depict an object at a position within the image;

accessing a calibration template from among a plurality of calibration templates based on at least the device attribute of the sensor device, the calibration template comprising a graphical indicator that comprises a set of graphical properties based on the position of the object within the image, and provides an indication of an optimal position of the object depicted by the image within the image frame, the graphical properties including a color that corresponds with the position of the object within the image relative to the graphical indicator;

generating a presentation of the image that includes a display of the graphical indicator of the calibration template overlaid upon the image; and causing display of the presentation of the image that includes the display of the graphical indicator overlaid upon the image at a client device communicatively coupled with the sensor device.

9. The system of claim 8, wherein the accessing the calibration template includes:

selecting the calibration template from among a set of calibration templates based on the set of image features of the image.

10. The system of claim 8, wherein the generating the presentation of the image that includes the display of the graphical indicator includes:

applying the graphical indicator within the image frame based on the optimal position of the object indicated by the calibration template.

11. The system of claim 10, wherein the applying the graphical indicator to the position within the image includes:

identifying a face at a position within the image based on the set of image features; and applying the graphical indicator to the image based on the position of the face depicted by the image.

12. The system of claim 10, wherein the applying the graphical indicator to the position within the image includes:

identifying a horizon at a position within the image based on the set of image features; and applying the graphical indicator to the image based on the position of the horizon depicted by the image.

13. The system of claim 10, wherein the applying the graphical indicator to the image based on the set of image features includes:

determining a first display state of the graphical indicator based on the set of image features of the image, the first display state including graphical properties; and causing display of the graphical indicator based on the graphical properties of the first display state.

14. The system of claim 10, wherein the image is a first image frame from a plurality of image frames of a video stream, the set of image features are a first set of image features, and the applying the graphical indicator to the first image frame based on the set of image features includes:

determining a first display state of the graphical indicator based on the first set of image features of the first image frame of the video stream, the first display state including a first set of graphical properties;

causing display of the graphical indicator upon the presentation of the video stream at the client device based on the first set of graphical properties associated with the first display state;

determining a second display state of the graphical indicator based on a second set of image features of a second image frame from among the plurality of image frames of the video stream; and causing display of the graphical indicator upon the presentation of the video stream at the client device based on the second set of graphical properties associated with the second display state.

15. A non-transitory machine-readable storage medium comprising instructions that, when executed by one or more processors of a machine, cause the machine to perform operations comprising:

accessing image data generated by a sensor device that comprises a device attribute, the image data comprising an image within an image frame, the image comprising a set of image features that depict an object at a position within the image;

accessing a calibration template from among a plurality of calibration templates based on at least the device attribute of the sensor device, the calibration template comprising a graphical indicator that comprises a set of graphical properties based on the position of the object within the image, and provides an indication of an optimal position of the object depicted by the image within the image frame, the graphical properties including a color that corresponds with the position of the object within the image relative to the graphical indicator;

generating a presentation of the image that includes a display of the graphical indicator of the calibration template overlaid upon the image; and causing display of the presentation of the image that includes the display of the graphical indicator overlaid upon the image at a client device communicatively coupled with the sensor device.

16. The non-transitory machine-readable storage medium of claim 15, wherein the accessing the calibration template includes:

selecting the calibration template from among a set of calibration templates based on the set of image features of the image.

17. The non-transitory machine-readable storage medium of claim 15, wherein the generating the presentation of the image that includes the display of the graphical indicator includes:

applying the graphical indicator within the image frame based on the optimal position of the object indicated by the calibration template.

18. The non-transitory machine-readable storage medium of claim 17, wherein the applying the graphical indicator to the position within the image includes:

identifying a face at a position within the image based on the set of image features; and applying the graphical indicator to the image based on the position of the face depicted by the image.

19. The non-transitory machine-readable storage medium of claim 17, wherein the applying the graphical indicator to the position within the image includes:

identifying a horizon at a position within the image based on the set of image features; and applying the graphical indicator to the image based on the position of the horizon depicted by the image.

20. The non-transitory machine-readable storage medium of claim 15, wherein the applying the graphical indicator to the image based on the set of image features includes:

determining a first display state of the graphical indicator based on the set of image features of the image, the first display state including graphical properties; and causing display of the graphical indicator based on the graphical properties of the first display state.

* * * * *